United States Patent [19]

Beyer

[11] Patent Number: 5,453,731
[45] Date of Patent: Sep. 26, 1995

[54] AUTOMOTIVE SWITCH LIGHTED WITH INTEGRAL DIODES

[75] Inventor: Robin H. Beyer, Utica, Mich.

[73] Assignee: Chrysler Corporation, Highland Park, Mich.

[21] Appl. No.: 155,566

[22] Filed: Nov. 22, 1993

[51] Int. Cl.⁶ .............................. G09G 3/14; H05B 37/02
[52] U.S. Cl. ................. 340/438; 340/525; 340/332; 200/315; 200/5 R; 315/152
[58] Field of Search .................... 340/461, 462, 340/513, 525; 362/800; 315/324, 362; 200/315, 316, 317

[56] References Cited

U.S. PATENT DOCUMENTS

| | | | |
|---|---|---|---|
| 3,598,950 | 8/1971 | Ohashi | 200/167 A |
| 3,873,979 | 3/1975 | Craford | 340/366 |
| 3,875,456 | 4/1975 | Kano | 313/501 |
| 3,924,256 | 12/1975 | Cohen | 340/274 R |
| 4,172,973 | 10/1979 | Sano | 200/315 |
| 4,686,425 | 8/1987 | Havel | 315/152 |
| 4,771,274 | 9/1988 | Havel | 340/703 |
| 4,812,814 | 3/1989 | Elliott | 340/332 |
| 5,003,298 | 3/1991 | Havel | 340/701 |
| 5,107,082 | 4/1992 | Valenzona | 200/292 |
| 5,134,387 | 7/1992 | Smith et al. | 340/701 |
| 5,149,924 | 9/1992 | Priesemuth | 200/5 R |
| 5,184,114 | 2/1993 | Brown | 340/701 |
| 5,194,854 | 3/1993 | Havel | 340/815.1 |
| 5,194,854 | 3/1993 | Havel | 340/815.1 |

FOREIGN PATENT DOCUMENTS 2680431  2/1993  France .......................... H01H/23/24

OTHER PUBLICATIONS

*Patent Abstracts of Japan* (C–791), vol. 14, No. 578, Dec. 21, 1990 (abstract of JP-A-2-250977).

Primary Examiner—Joseph Mancuso
Assistant Examiner—Andrew B. Christensen
Attorney, Agent, or Firm—Christopher A. Taravella

[57] ABSTRACT

A two color, light emitting diode having a green diode and a red diode therein is incorporated with a control switch for an automotive accessory. The control switch is normally green in color providing a finger target when the system is not operated because only the green diode emits light. The diode is amber in color upon closing the switch because the red diode and green diode are both illuminated. The two color, light emitting diode is used for accessory systems such as electric windows, traction control systems, rear window defrosters and other accessory systems.

6 Claims, 2 Drawing Sheets

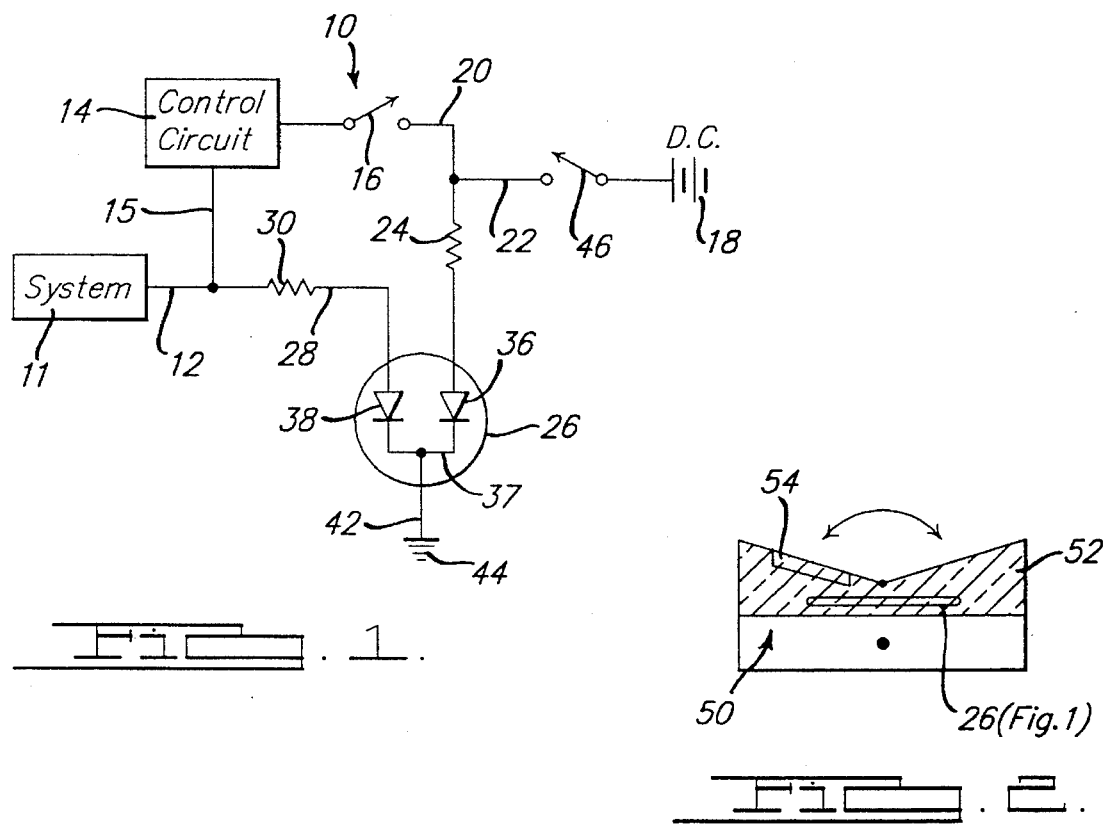
Fig. 1.
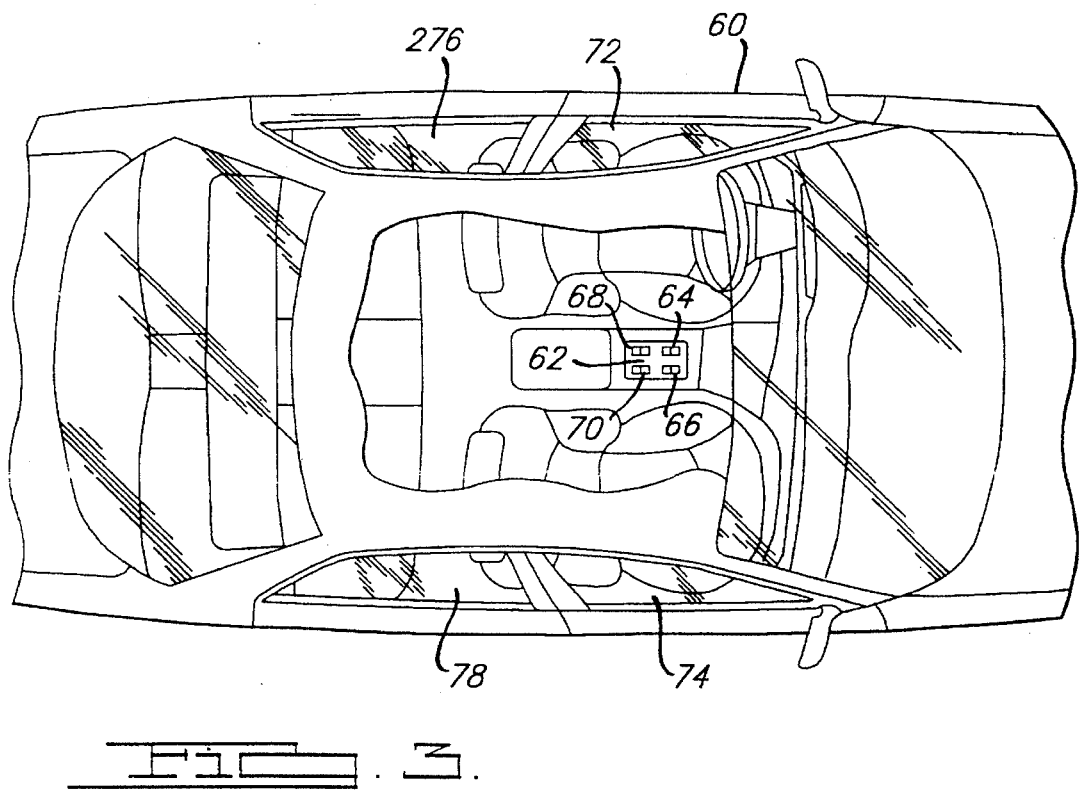
Fig. 2.
Fig. 3.

5,453,731

AUTOMOTIVE SWITCH LIGHTED WITH INTEGRAL DIODES

FIELD OF THE INVENTION

The present invention relates to automotive switch lighting arrangements. More particularly, the present invention relates to automotive switch lighting arrangements wherein drivers and passengers are provided with light switch to identify the locations of switches while also indicating the condition of the automotive device activated by the switch.

BACKGROUND OF THE INVENTION

It is always preferable to provide a driver of an automobile and, at times, automobile passengers with readily available information as to the conditions of various systems utilized in modern automobiles. Modern automobiles employ a large number of electrically operated systems such as, for example, electric windows, traction control, rear window defrosters and electric seats. Each of these systems are selected and operated by separate switches resulting a multiplicity of switches. Operating these switches requires at least the brief attention of a driver. Since the condition of many of these systems is not readily apparent to a driver, it is desirable to provide as rapid an indication as possible as to the mode of the system. For example, it may not be readily apparent to a driver when a car is not moving that rear wing windows are open, or that a rear window defroster is on, or that a traction control has been activated. The most convenient way to notify the driver is with a visual signal. If there are too many visual signals, then the driver can become confused and, in operating an automobile, confusion, even for a very short time, is undesirable. These problems are especially acute at night wherein the orientation of a rocker-type switch or perhaps toggle switches is not readily apparent and where it is desirable for the driver to know at a glance, not only the location of the particular switch being selected, but also the mode of the system operated by the switch.

SUMMARY OF THE INVENTION

In view of the aforementioned considerations, it is a feature of the present invention to provide a new and improved automotive switch, wherein the switch is readily locatable in the dark and wherein the mode of the system operated by the switch is indicated by a light associated therewith.

In view of this feature and other features, the instant invention contemplates, in combination; an automotive accessory system, a switch for operating that system and a light emitting diode disposed between the switch and the system wherein the light emitting diode is a three color, three lead diode including a red diode and a green diode, one of which is continuously energized and the other of which is energized upon operating the system. The three color, three lead, light emitting diode is positioned in proximity with the switch so as to facilitate locating the switch in the dark while the other light emitting diode to produce a third color combines with the first light emitting diode to indicate the mode of the system.

In accordance with a first specific embodiment of the combination, the system of the combination is an electric window system.

In accordance with another embodiment of the combination, the system of the combination is a rear defroster system.

In accordance with still another embodiment of the combination, the system is a traction control system.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein:

FIG. 1 is a circuit diagram showing a general application of a three color, three lead, light emitting diode employed with an accessory system of an automobile;

FIG. 2 is a side view of a rocker-type switch including the diode of FIG. 1 integral therewith;

FIG. 3 is a top view of the interior of an automobile;

DETAILED DESCRIPTION

Figure 4:
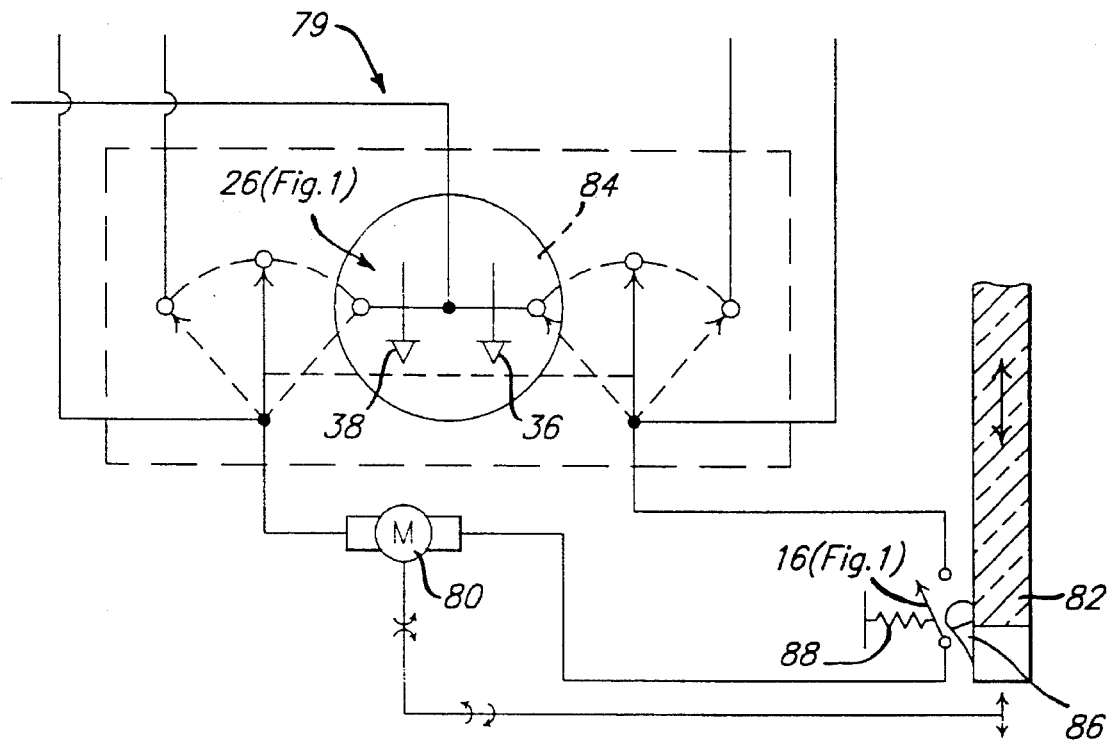
FIG. 4 is a schematic view showing the system of FIG. 1 employed to operate electrical windows of an automobile using the switch of FIG. 2.

Referring now to FIG. 1, there is shown a general illustration of a circuit 10 for use in automotive systems in accordance with the instant invention. The circuit 10 operates an accessory system 11 which might, for example, be an electric window system, a rear defroster system or traction control system. A control circuit 14 is connected by line 15 to the line 12. The circuit 14 in system 10 is connected through a switch 16 to the battery 18 of an automotive vehicle via lines 20 and 22. In accordance with the present invention, the battery 18 is also connected through a resistor 24 to a two color, three lead, light emitting diode 26 which is parallel with the circuit 14 and has a lead 28 connected through resistor 30 to the line 12.

The two color, three lead, light emitting diode system 26 includes a first diode element 36 which emits green light and is connected by a lead 37 in series with a second diode element 38 which emits red light. The diode element 38 is connected directly to lead 28 and thus directly to the system 10. A ground lead 42 connects the internal diode lead 37 directly to ground 44. Normally, the line 22 is connected to the battery 18 through an ignition switch 46 of the automotive vehicle so that the circuit 14 which operates the system 10, is connected to the battery 18 upon starting the vehicle or upon closing the ignition switch so as to activate electrical accessory systems in the vehicle.

In operation, when the ignition switch 46 is closed, current flows over line 22, through resistor 24 and through the green light emitting diode element 36 to ground 44 via line 42. The light emitting diode system 26 thus appears green and provides green background light. When the diode system 26 is positioned in proximity with or integral with the switch 16, the green background light provides a target so that the driver can visually locate the position of the switch and immediately operate the switch with his finger. Location of the switch 16 is therefore accomplished with a quick glance so that in the dark the driver need not become distracted by searching for the switch. If a driver must search for a switch, then there is a chance that the driver may hit the wrong switch and activate the wrong system causing the driver to become even more detracted.

Referring now to FIG. 2, there is shown a rocker-type automotive switch 50 which has a transparent body portion 52 incorporating the light emitting diode 26 therein so that the light emitting diode system is part of the switch and is visible outside of the switch. When the ignition is on, the rocker switch 50 will glow green and be readily locatable at a glance by the driver. There will, of course, be a number of switches, all of which are illuminated green until operated. Accordingly, each switch 50 can have an indicating figurine 54 thereon providing a pictorial representation of the system being controlled by the switch. For example, if the system being controlled is an electric window, a window can be used. If it is a rear window defroster, then the defrost signal can be used or, if it is a traction control system, then a wheel can be shown.

Referring now to FIG. 3, there is shown a cabin 60 of an automobile having a console 62 with window switches 64, 66 and 70 thereon. The window switches 64 and 66 operate front windows 72 and 74 while the switches 66 and 70 operate rear wing windows 76 and 78. In accordance with the features of the instant invention, the switches 64–70 are each configured like the switch 50 of FIG. 2 so as to be readily visible in the dark within the cabin 60 of the automobile.

Referring now to FIG. 4, a control circuit 79 for one window is shown wherein a motor 80 drives a window 82 which is an example of one of the windows 72–78. The motor 80 is operated by a switch 84 which may, for example, be one of the switches 64–70 (see FIG. 3). Associated with the window 82 is the switch 16 of FIG. 1 which is open as long as the window 82 is in its completely up position. The switch 84 is a rocker switch such as the rocker switch 50 of FIG. 2 having a transparent or translucent portion 52 so that the light emitted by the two color, three lead diode 26 is visible therethrough. As had been previously explained with respect to FIG. 1, as long as the window 82 is in its completely up position, the diode system 26 emits a green light. Upon operating the window switch 84, the switch 16 is closed, causing the light emitting diode 38 within the two color light emitting diode system 26 to illuminate. The red and green diodes then combine to emit an amber light indicating that the window 82 is open. As long as the window 82 remains open, the light emitting diode system 26 will be amber. If the window 82 is left partially open, then the light emitting diode system 26 will still emit amber light. It is only when the window 82 is completely closed that the light emitting diode system 26 is green.

The switch 16 may be operated in a number of conventional ways. For example, the switch 16 may be a proximity switch located in a door of a vehicle which closes when the window 82 is out of proximity therewith and which is opened upon the window 82 being in proximity therewith. Such a switch 16 might be a normally closed switch operated by a cam 86 which holds the normally closed switch open until it disengages from the normally closed switch allowing the normally closed switch to close. As the window 82 moves down, the cam 86 no longer overcomes a spring 88 which allows the spring 88 to close the switch 16.

Figure 5:
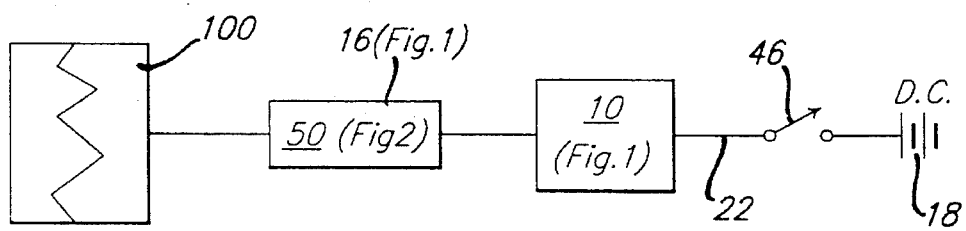
FIG. 5 is a schematic view showing the system of FIG. 1 and switch of FIG. 2 employed to operate a rear defroster system of an automobile.

Referring now to FIG. 5, there is shown an arrangement where a rear window defroster 100 is operated by the switch 16. The rear window defroster 100 is operated by the switch 16 configured as a transparent rocker switch, such as the switch 50, wherein the light emitting diode 26 is visible through at least a transparent portion 52 of the switch 50. The remainder of the circuit is identical to the circuit of FIG. 1.

Figure 6:
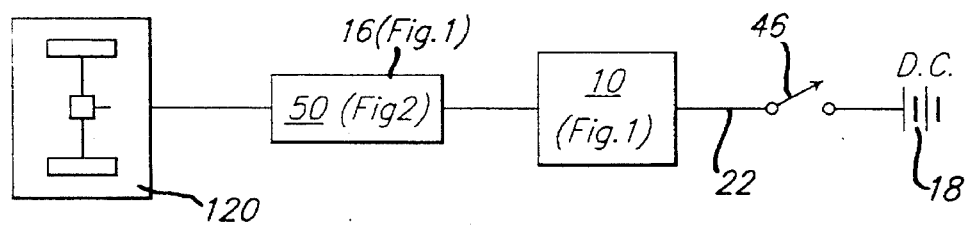
FIG. 6 is a schematic view showing the system of FIG. 1 and the switch of FIG. 2 used with a traction control system of an automotive vehicle.

Referring now to FIG. 6, a traction control 120 is shown connected to a switch 50, such as the switch of FIG. 2. As with the rear window defroster arrangement 100 of FIG. 5, the traction control arrangement of FIG. 6 is controlled by a circuit substantially identical to that of FIG. 1, wherein the switch 16 is configured as the rocker switch 50.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In an accessory control system for determining whether an accessory for an automotive vehicle is in a first mode or a second mode, wherein the accessory control system is powered by a source of current connected to the accessory control system by a manual switch having a body portion configured for finger operation, the improvement comprising:

a light emitting diode system comprising first and second diode elements emitting first and second colors, the diodes being in proximity with one another, the light emitting diode system being disposed between the source of current and the accessory control system and being incorporated into the structure of the switch so that the light of the diode system is visible therethrough, wherein when only the first diode element is energized, the diode system and thus the switch is a first color and when both diode elements are energized, the diode system and thus the switch is a third color which is a combination of the first and second colors;

a first line connecting the first diode element to the source of current for energizing the first diode element to emit the first color through the switch continuously to provide a viable indication that the accessory is in the first mode and a visible target for the operator's finger;

a second line connecting the second diode element and the accessory control circuit through the manual switch to the source of current wherein when the manual switch is closed, the second diode element is energized to emit the second color continuously through the switch with the first color to provide a visible indication in the third color that the accessory is in the second mode and to provide a visible target for the operator's finger.

2. The combination of claim 1, wherein the first diode element emits green light and the second diode element emits red light whereby the three color diode is green when the switch is open and is amber when the switch is closed.

3. The combination of claim 1, wherein the accessory control system operates a rear window defrost system.

4. The combination of claim 1, wherein the accessory control system operates a traction control system.

5. In combination with a vehicle having electric windows, each powered to a lowered and raised position by an electric motor operated by a manual switch having a body portion; a two color diode system integral with the body portion of the manual switch to provide a visible target for an operator's finger, the two color diode system having a first diode element connected directly to ground and a second diode element connected to the motor via a window operated switch, the window operated switch being normally closed;

means associated with the window for holding the window operated switch open when the window is closed and for allowing the window operated switch to close when the window is open, whereby the two color, light emitting diode system is illuminated by the first diode element when the window is closed and by both the first and second diode elements when the window is open to emit a third color.

6. The combination of claim 5, wherein the first diode element emits green light and the second diode element emits red light whereby, when the window is closed, the three color diode system is green and when the window is open, the three color diode system is amber.

* * * * *